May 15, 1923.
H. R. SEIFERT
MILKING DEVICE
Filed Sept. 18, 1920   2 Sheets-Sheet 2
1,455,672
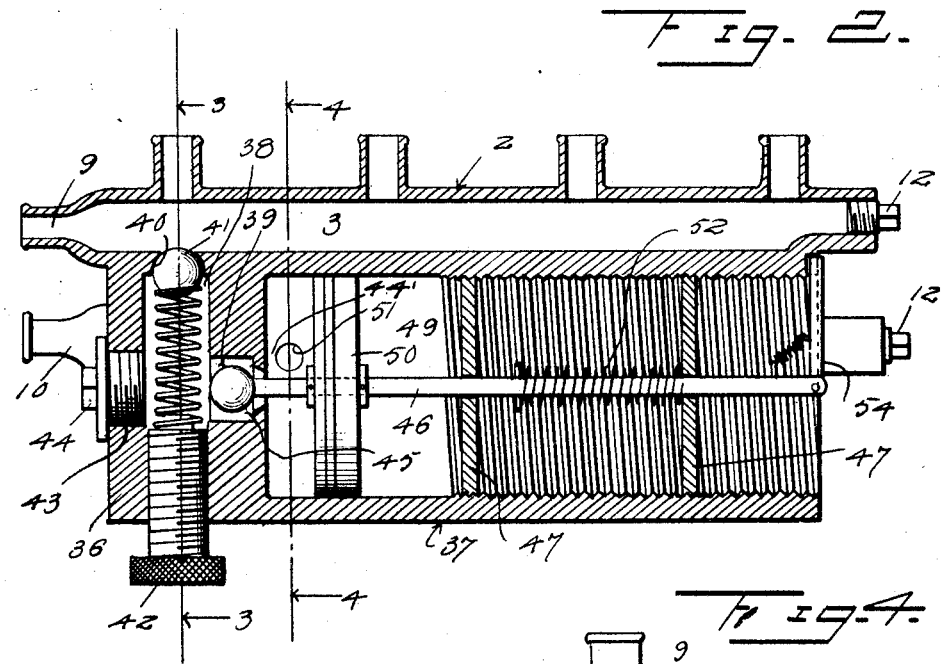
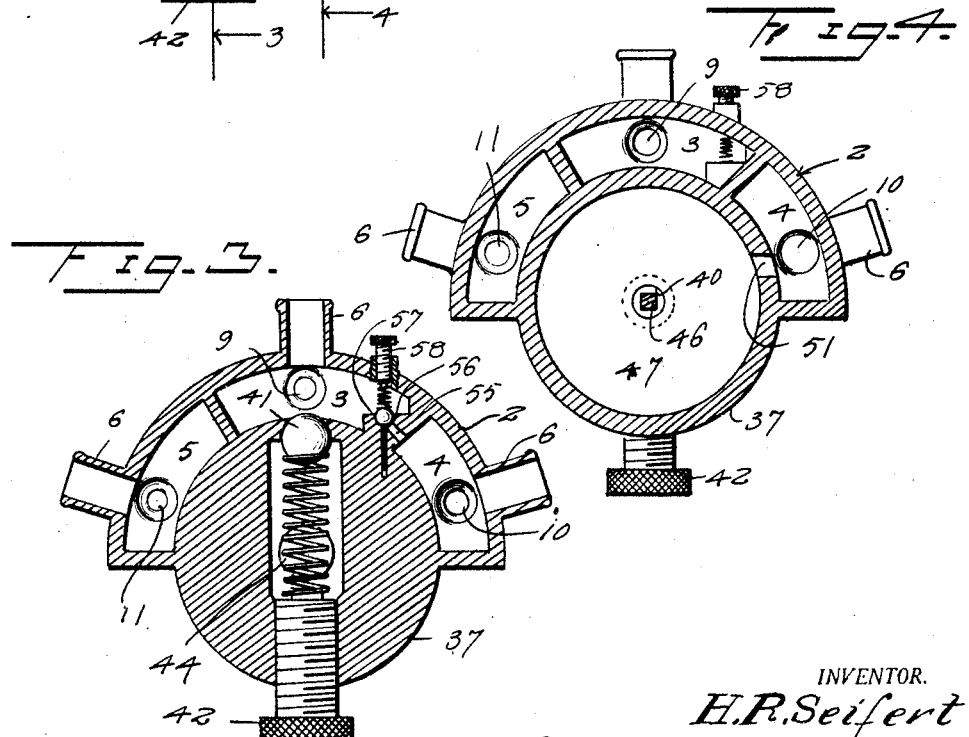
INVENTOR.
H.R.Seifert
BY
ATTORNEY.

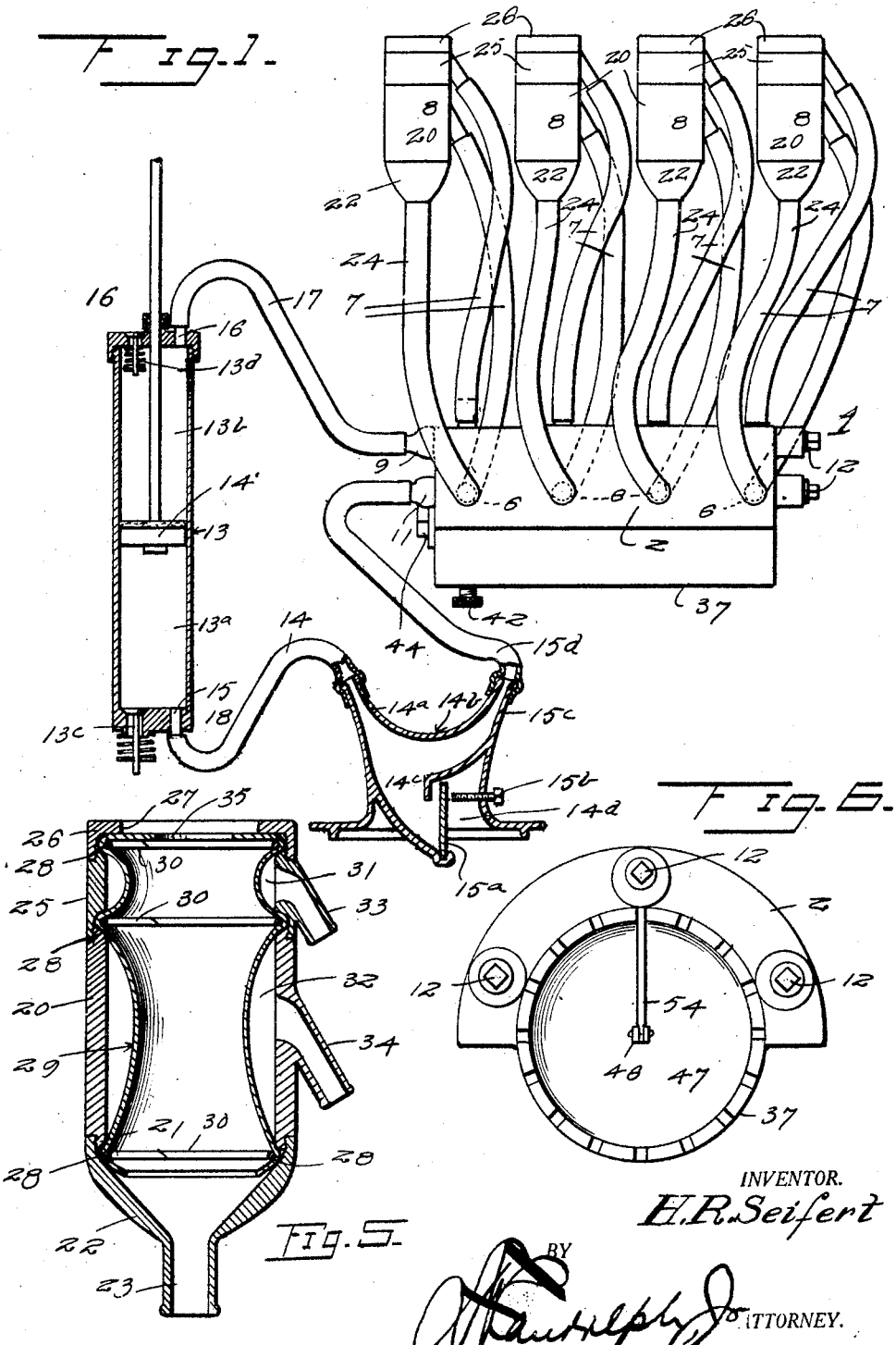

Patented May 15, 1923.

1,455,672

UNITED STATES PATENT OFFICE.

HENRY R. SEIFERT, OF EAST ELLSWORTH, WISCONSIN.

MILKING DEVICE.

Application filed September 18, 1920. Serial No. 411,050.

*To all whom it may concern:*

Be it known that I, HENRY R. SEIFERT, a citizen of the United States, residing at East Ellsworth, in the county of Pierce and State of Wisconsin, have invented certain new and useful Improvements in Milking Devices; and I do hereby declare the following to be a full, clear, and exact description of the invention, such as will enable others skilled in the art to which it appertains to make and use the same.

This invention relates to new and useful improvements in milking devices and has for its primary object the provision of a device of the above stated character whereby the milk may be extracted from a teat by vacuum and pneumatic means and which pneumatic means is adapted to render an alternating squeezing and releasing action on the teat so as to first cut off the flow of milk from the udder to the teat and later squeeze the teat with a sucking action on the end thereof so that the milk will be entirely extracted therefrom and then release its action on the teat so that it may again fill with milk.

Another object of this invention is the provision of a milking device of the above stated character, which will be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a side elevation partly in section illustrating a milking device constructed in accordance with my invention.

Figure 2 is a longitudinal sectional view illustrating pressure controlling and exhausting means to the teat cup, Figure 3 is a transverse sectional view taken on the line 3—3 of Figure 2, Figure 4 is a similar view taken on the line 4—4 of Figure 2, Figure 5 is a sectional view illustrating the teat cup, Figure 6 is an end view, illustrating the pressure controlling and exhausting means.

Referring in detail to the drawings, the numeral 1 indicates as an entirety a pressure control device which includes a transversely curved casing 2 having formed therein high and low pressure chambers 3 and 4, and a vacuum chamber 5. The chambers 3, 4, and 5 have in communication therewith nipples 6 to which are connected flexible hose 7 and the hose are in turn connected to teat receiving cups 8. Inlet nozzles 9, 10, and 11 are formed on the high, low and vacuum chambers at one of their ends while their other ends are closed by removable plugs 12 so that said chambers may be easily and conveniently cleansed when desired.

A pump 13 is of the type capable of creating a vacuum in the end $13^a$ and a pressure in the end $13^b$ and has a vacuum regulating valve $13^c$ in the vacuum end $13^a$ and a pressure release valve $13^d$ in the pressure end $13^b$. A piston 14' is mounted for reciprocation in the cylinder of the pump and has a leather facing disposed towards the pressure end $13^b$. A hose 14 is connected to the vaccum end $13^a$ by a nipple 15 and said hose is in turn connected to a nipple $14^a$ of a milk pail or receptacle cover $14^b$ and which has chambers $14^c$ and $14^d$ separated by a valve $15^a$ that has its movement regulated by a set screw $15^b$. The chamber $14^d$ communicates with a milk pail or receptacle, while the chamber $14^c$ has a nipple $15^c$ to which a hose $15^d$ is connected. The hose $15^d$ is in turn connected to the nipple 11 of the vacuum chamber 5. The pressure end $13^b$ of the pump 13 is provided with nipple 16 to which a hose 17 is connected and the latter is in turn connected to the nipple 9 of the high pressure chamber 3. On movement of the piston in the direction of the pressure end $13^b$ of the pump cylinder, a pressure is created in the high pressure chamber 3 and at the same time a partial vacuum is created in the vacuum end $13^a$ which draws milk from the teat cups into the chamber $14^c$ of the cover $14^b$ and on the piston moving in a reverse direction, a very low pressure is created in the vacuum end $13^a$ of the pump which is sufficient to unseat the valve $15^a$ and permit the milk from the chamber $14^c$ to drain into the milk pail or receptacle by way of the chamber $14^d$. When the piston is on the last named stroke sufficient air will pass the piston owing to the leather facing to prevent a vacuum being created in the pressure end 13^b of the pump cylinder. The valves 13^c and 13^d are employed to regulate the vacuum and pressure in the vacuum and pressure ends 13^a and 13^b of the pump cylinder.

Each of the teat receiving cups are identical in construction and reference to one is thought sufficient for all. The cup 8 consists of a cylindrical body 20 which has a reduced screw threaded flange 21 on each end and one of the flanges has threaded thereto a discharge neck 22 provided with a nipple 23 to which the hose 24 is connected, and the other end of said hose is connected to one of the nipples of the vacuum chamber 5. An annular member 25 is threaded to the other flange 21 of the cylindrical body 20 and is provided with screw threaded flanges at each end, one of which connects with the body and the other is threaded to a cap 26 provided with a teat receiving opening 27. Grooves 28 are formed between the connections of the body to the discharge neck 22 and the annular member 25 and said body and also between the cap and the annular member 25 and said body and said grooves are adapted to receive a rubber liner 29, which liner is secured in said grooves by tension members 30 so as to form a high pressure chamber 31 in the upper portion of the teat cup and a low pressure chamber 32 within the body of the teat cup. Nozzles 33 and 34 are formed on the cup 8 and have communication with the high and low pressure chambers 31 and 32 and have connected thereto the hose 7 which lead to the high and low pressure chambers 3 and 4.

The upper end of the liner 29 is provided with an opening 35, the wall of which is adapted to engage the teat for aiding in holding the cup on the teat.

A head 36 is formed integrally with the casing 2 and also integrally with one end of a cylinder 37 which is also formed integrally with the casing and the head 36 has located therein a passage 38 which communicates with the high pressure chamber 3 and with a passage 39 leading into the cylinder 37. The passage 38 has a valve seat 40 which is engaged by a spring actuated ball valve 41 and which valve is adjusted by means of a plug 42 closing one end of the passage 38. The passage 38 also communicates with an opening 43 closed by a removable plug 44 providing further means whereby the spring of the valve may be regulated or adjusted and also whereby the passage can be cleaned when desired. The passage 39 is provided with a valve seat 44' to be engaged by a valve 45 formed on the end of a piston stem 46 and which is slidably mounted within plates 47 located in the cylinder 37. One of the plates 47 cooperate with the head 36 in forming a chamber 49 and in which a piston 50 carried by the stem 46 operates. A passage 51 leads from the chamber 49 to the low pressure chamber 4. A spring 52 is mounted on the stem 46 between the plates 47 and is adapted to normally hold the valve 45 in an unseated position, thereby permitting air pressure to pass from the passage 38 into the chamber 49 and thence into the low pressure chamber 4. The stem 46 is provided with an adjusting means 54 at the open end of the cylinder 37 whereby the tension of the spring 52 may be varied so that the pressure within the chamber 49 may be varied. The stem 46 is of rectangular shape in cross section and is received in corresponding shaped openings in the plate 47 to prevent rotation of the valve stem or the valve 45 and the plates 47 have threaded engagement with the walls of said cylinder.

A passage 55 leads between the high and low pressure chambers in the casing 2 and has a valve seat 56 engaged by a spring actuated valve 57 which may be adjusted by a plug 58 threaded in the casing 2 and provides a construction which will permit the pressure to escape from the low pressure chamber into the high pressure chamber, when the pressure within the high pressure chamber is reduced or released.

In operation, the pump 13 creates a vacuum in one end and a pressure at its other end and the vacuum end of the pump creates a vacuum within the vacuum chamber causing a suction on the discharge neck 22 and the pressure end of the pump creates a pressure in the high pressure chamber which passes into the high pressure chamber 31 of the teat cup 8 cutting off the supply of milk to the teat from the udder, and after the pressure within the high pressure chamber 3 reaches a certain degree, the valve 41 is forced open permitting the pressure to pass through the passages 38, 39 and into the chamber 49 whence it passes into the low pressure chamber 4 and thence into the low pressure chamber 32 of the teat cup causing the liner 29 to expand or squeeze the teat and force the milk therefrom along with the action of the suction created by the vacuum. The milk flows from the teat through the discharge neck 22 and is collected in the chamber 14^c of the cover 14^b. Then the piston of the pump starts on its reverse stroke, the vacuum to the vacuum chamber is broken and also the pressure of air is withdrawn from the high pressure chamber and the valve 57 unseats permitting the pressure within the low pressure chamber 4 and 32 of the teat cup 8 to escape to the high pressure chamber 3 of the casing 1 and return to the pressure end of the pump. On the last mentioned stroke of the piston, the valve 15ª is unseated and the milk in the chamber 14ᶜ flows into the milk collecting receptacle.

While I have shown and described the preferred embodiment of my invention, it will be understood that minor changes in construction, combination, and arrangement of parts may be made without departing from the spirit and scope of the invention as claimed.

Having thus described my invention, what I claim is:

1. A milking device comprising teat cups, high and low teat squeezing means in said cups, a casing having high and low pressure chambers and said high pressure chamber connected to a pump, means connecting the chamber to the high and low teat squeezing means, a vacuum chamber in said casing and connected to the pump and cups, means permitting air pressure to pass from the high pressure chamber to the low pressure chamber at a predetermined pressure in said high pressure chamber, and means exhausting air pressure from the low pressure chamber to the high pressure chamber when the pump exhausts the pressure from the latter.

2. A milking device comprising a casing, high and low pressure chambers in said casing and connected to a pump, a vacuum chamber in said casing, teat cups, pairs of teat squeezing means in said cups and connected to the high and low pressure chambers, means connecting the cups to the vacuum chamber, means admitting air pressure from the high pressure chamber to the low pressure chamber on the working stroke of the pump, means permitting the escape of air pressure from the low pressure chamber to the high pressure chamber on the exhaustion of air from the high pressure chamber by the pump, and means regulating the pressure in the low pressure chamber.

3. A milking device comprising a casing, high and low pressure chambers in said casing and connected to a pump, a vacuum chamber in said casing, teat cups, pairs of teat squeezing means in said cups and connected to the high and low pressure chambers, means connecting the cups to the vacuum chamber, said high and low pressure chambers having passages therebetween, and valves in said passages for admitting air pressure to the low pressure chamber from the high pressure chamber on the working stroke of the pump and for admitting air pressure from the low pressure chamber to the high pressure chamber on the exhaustion of air pressure from the high pressure chamber by the pump, and a valve associated with one of said passages for controlling the amount of air pressure to the low pressure chamber from the high pressure chamber.

4. In combination, teat cups having pairs of teat squeezing means, high and low pressure chambers connected to said means and one of said chambers connected to a pump, a casing having the chambers built thereon and of a length substantially the length of said chambers and having ports leading into the chambers, and an adjustable regulator in said casing for controlling the ports to permit one of the teat squeezing means of each cup to receive a greater pressure than the other teat squeezing means.

In testimony whereof I affix my signature in presence of two witnesses.

HENRY R. SEIFERT.

Witnesses:
 HELEN V. RUDOLPH,
 FRANK E. O'BRIEN.